United States Patent Office

2,753,329
Patented July 3, 1956

2,753,329

POLYMERIZATION OF TETRAFLUOROETHYLENE WITH TERTIARY BUTYL PEROXIDE OR PERACETATE

Adam Edgar Kroll, Kennett Square, Pa., and David Albert Nelson, Wilmington, Del., assignors to E. I. du Pont de Nemours and Company, Wilmington, Del., a corporation of Delaware No Drawing. Application March 23, 1953,
Serial No. 344,184

4 Claims. (Cl. 260—92.1)

This invention relates to the preparation of polymers of tetrafluoroethylene, and, more particularly, it relates to catalysts capable of initiating the polymerization of tetrafluoroethylene containing small amounts of a polymerization inhibitor.

As described in U. S. Patent 2,230,654, Roy J. Plunkett, issued February 4, 1941, polymerization of tetrafluoroethylene takes place when it is stored at room temperature. Obviously, it is not desirable for a monomer to polymerize during storage, when it is planned to utilize the monomer in a specific process after a storage period. In U. S. Patent 2,407,405, Melvin A. Dietrich and Robert M. Joyce, Jr., issued September 10, 1946, there is described a means for inhibiting the polymerization of tetrafluoroethylene by the employment of a small amount of ethylenically unsaturated hydrocarbon material. It is particularly pointed out that "Terpene B" hydrocarbon mixture is especially suited for inhibiting the polymerization of tetrafluoroethylene. "Terpene B" is a mixture of unsaturated hydrocarbons, principally terpenes, such as dipentene and terpinolene, boiling at about 175° C. to 195° C. This type of polymerization inhibitor may be present in amounts up to 10% by weight of the tetrafluoroethylene, although amounts of less than 1%, or as low as 5–10 p. p. m., are satisfactory in some instances. The inhibitor is not only useful in preventing polymerization during storage of the purified monomer, but also is advantageously employed in the equipment, such as distillation columns and compressors, utilized in the process of purifying the monomer from its crude synthesis mixture. In the absence of an inhibitor, the monomer may polymerize at various places in the purification process equipment, necessitating expensive shut-downs to remove polymer which has plugged lines, valves, and other critical points in the equipment.

In a similar manner, U. S. Patent 2,407,419, William E. Hanford, issued September 10, 1946, describes and claims a method of inhibiting the polymerization of tetrafluoroethylene by the incorporation of tertiary hydrocarbon amines into the monomeric tetrafluoroethylene.

The addition of inhibitor has therefore solved many problems in the process of recovering purified monomer and storing it for later use. However, before the monomeric tetrafluoroethylene could be used to prepare polymeric tetrafluoroethylene, it was necessary to remove the inhibitor compound prior to the polymerization step. Furthermore, when "Terpene B" is used as the inhibitor it has been found necessary to purify the monomer to the extent that no more than about 1–2 p. p. m. of inhibitor were present. In order to assure that the concentration of "Terpene B," or any other inhibitor would be sufficiently low, it has been found necessary to utilize costly equipment to effect separation of all but traces of the inhibitor from tetrafluoroethylene.

Presently known processes for making granular or dispersed polytetrafluoroethylene require, for economical operation, that the concentration of polymerization inhibitor be reduced almost to a trace. An excess of inhibitor, such as "Terpene B," causes two undesirable results; first, the speed of polymerization slows down with increasing amounts of inhibitor, and when the inhibitor reaches a high enough concentration polymerization stops altogether, and secondly, the quality of polymer produced becomes poorer with increasing amounts of inhibitor present in the monomer. Thus it can be seen that even though a longer polymerization cycle could be tolerated, although not desired for economical operations, a lower quality of polymer could not be tolerated at the same time. Known processes require that the concentration of terpenic inhibitor be no greater than about 1–2 p. p. m. in monomeric tetrafluoroethylene or the polymeric product will be of such poor quality that it will be commercially undesirable. Furthermore, an increase of inhibitor up to about 10 p. p. m. necessitates a polymerization cycle of approximately twice as long as that required when the inhibitor concentration is 1–2 p. p. m. It is apparent therefore, that a process which is relatively insensitive to the concentration of inhibitor is highly desirable.

It is an object of this invention to provide new catalysts capable of initating the polymerization of tetrafluoroethylene which may contain more than traces of a polymerization inhibitor. It is another object of this invention to provide a novel process for the vapor phase polymerization of tetrafluoroethylene to produce a water repellant, powdery solid. It is still another object of this invention to eliminate the costly and time consuming process steps of removing all but minute amounts of inhibitor to produce purified tetrafluoroethylene monomer.

The above objects are accomplished by employing peroxide and peracetate catalysts, particularly ditertiary butyl peroxide and tertiary butyl peracetate, as initiators for the polymerization of tetrafluoroethylene. These catalysts produce a fluidizable, powdery polymer. The catalysts are active in the presence of 2000 p. p. m. or more of an inhibitor, such as "Terpene B," alpha-pinene, N-methyl pyrrole, other ethylenically unsaturated hydrocarbon inhibitors, and other tertiary hydrocarbon amine inhibitors.

The polymerization is conducted by introducing a small amount of ditertiary butyl peroxide or tertiary butyl peracetate into tetrafluoroethylene monomer inhibited with up to 2000 p. p. m. of "Terpene B" or other inhibitor. It is convenient, although not necessary, to maintain an inert liquid in the reaction chamber. The purpose of the liquid is to serve as a heat transfer medium in removing the heat of reaction. Therefore water is a convenient liquid for this reaction. The reaction is accomplished by maintaining the reaction system at about 125° C. to about 200° C. and a pressure of at least 100 pounds per square inch. The polymer which is produced is a very fine, powdery, solid floating on the water. The solid polymer may be separated from the water by a skimming operation or by filtering, although the former is easier.

The process of this invention is novel and inventive in three aspects. In the first place is the unique form of the polymer. Heretofore, polytetrafluoroethylene has been produced as a granular solid and as a dispersion. The product of this invention is not a dispersion because it is not wetted by water and is produced as a solid floating on top of the liquid medium. This form of polymer does not adhere to the walls of a metallic reactor as has been the case many times in the past when known processes were used. The known processes producing granular polytetrafluoroethylene result in rather large granules of partially water-wetted polymer. The granules are, for the most part, large enough to be retained on a 35-mesh Tyler standard screen. The particles produced by the present process are easily fluidizable in an air stream and are small enough to be retained in part by a 325-mesh Tyler standard screen. Thus this new process unexpectedly produces dry, discrete particles of powdery white solids, an unique form of polytetrafluoroethylene.

The second aspect of this invention is that the polymerization occurs in the presence of polymerization inhibitors. As has already been explained, the inhibitors slow down or completely prevent polymerization of tetrafluoroethylene, as the amount of inhibitor is increased. This invention therefore permits monomer to be processed and stored without polymerization occurring, and yet be polymerizable without further treatment to remove the inhibitor. Furthermore, the present invention is desirable because it does not produce clumps of polymer adhering to the walls of the reactor, a problem which has plagued operators of known processes.

The third aspect is that polymerization occurs by a vapor phase process. The catalysts and the reaction medium are under conditions of temperature and pressure such that more than 99% of the catalyst is present in the vapor of the system. Further evidence of this fact is that the polymer produced is completely repellant to water, which is not the case when polymerization is effected by a water-soluble catalyst, such as a persulfate salt, to produce granular polymer which is wetted by water.

In the preferred embodiment of this invention gaseous monomeric tetrafluoroethylene containing no more than about 2000 p. p. m. of a polymerization inhibitor, which may be an ethylenically unsaturated hydrocarbon or a tertiary hydrocarbon amine, is introduced into a reactor partially filled with water and containing not more than about 0.005 gram per cubic centimeter of monomer at the reaction conditions, of ditertiary butyl peroxide or tertiary butyl peracetate. The reaction mixture is then subjected to a pressure of 100 to 500 p. s. i. and a temperature of 100° C. to 250° C. for a time sufficient to allow polymerization to occur. The product which forms is powdery, white polytetrafluoroethylene, floating on the surface of the water.

The following examples will more fully describe this invention. Wherever "p. p. m. of 'Terpene B'" is found herein, it is to be understood that it means microliters of "Terpene B" measured at 25° C. per liter of tetrafluoroethylene measured as a liquid at −78° C. In other applications herein, p. p. m. has its normally understood definition, i. e., units of mass per million units of mass.

*Example 1.*—A 300-ml. stainless steel shaker tube was charged with 200 ml. of deoxidized water, 10 ml. of n-heptane, 0.02 gram of ammonium persulfate catalyst and sufficient tetrafluoroethylene monomer to effect a pressure of 300 p. s. i. in the tube. The monomer charged into the tube contained 6.4 p. p. m. of "Terpene B" as a polymerization inhibitor. Heptane is also a polymerization inhibitor. After the tube was sealed it was shaken for 43 minutes during which time the temperature was raised to 60° C. Then the tube was shaken for 130 minutes at 60°–65° C. and finally for 30 minutes more at 90° C. The tube was opened and found to contain only a trace of polymer.

In a series of similar runs polymer was produced in some cases, but it had a poor quality, required a long period to accomplish polymerization, and many times adhered to the walls of the shaker tube. This example illustrates the state of the known art when attempting to polymerize tetrafluoroethylene containing a small amount of "Terpene B" inhibitor.

*Example 2.*—A 300-ml. stainless steel shaker tube charged with 200 ml. of deoxidized water, 1 gram of ammonium perfluorocarboxylate dispersing agent, 0.3 gram of ditertiary butyl peroxide and sufficient tetrafluoroethylene monomer to effect a pressure of 300 p. s. i. in the tube. The monomer charged into the tube contained 1.8 p. p. m. of "Terpene B." After the tube was sealed, it was shaken for 25 minutes at 25° C. to 150° C., followed by 80 minutes at 145° C. to 160° C. The pressure in the shaker tube ranged from 250 to 320 p. s. i. during the period of shaking. The tube was opened and found to contain 28.1 grams of polymeric tetrafluoroethylene solids in the form of a white powder floating on the water.

*Example 3.*—Into a 300-ml. stainless steel shaker tube there was charged 200 ml. of deoxidized water, 0.3 gram of tertiary butyl peracetate, and sufficient tetrafluoroethylene to effect a pressure of 310 p. s. i. inside the tube after it was sealed. The tetrafluoroethylene contained 2.3 p. p. m. of "Terpene B." After sealing, the tube was shaken for 20 minutes at a temperature from 25° to 125° C., and then for 85 minutes at 125° to 140° C. The pressure inside the tube varied from 140 to 310 p. s. i. during the experiment. When the tube was opened, it contained 55.0 grams of polymeric tetrafluoroethylene as a white powder which was not wetted by the water and did not adhere to the walls of the tube.

*Example 4.*—A 300-ml. stainless steel shaker tube was charged with 200 ml. of deoxidized water, 0.3 gram of ditertiary butyl peroxide, and sufficient tetrafluoroethylene to form a pressure of 300 p. s. i. inside the tube, the tetrafluoroethylene containing 3.0 p. p. m. of "Terpene B" inhibitor. The tube was sealed and shaken for 25 minutes at 25°–150° C. and then for 50 minutes at 150°–175° C. As the experiment progressed the pressure inside the tube gradually diminished, and the pressure was kept at 300 p. s. i. by the addition of tetrafluoroethylene. After the period of shaking was completed, the tube was opened and found to contain 39.6 grams of polytetrafluoroethylene in the form of a very fine powder completely unwetted by the water in the tube.

*Example 5.*—A 300-ml. stainless steel shaker tube was charged with 200 ml. of deoxidized water, 0.3 gram of tertiary butyl peracetate, 1.0 gram of $C_9$ ammonium perfluorocarboxylate and sufficient tetrafluoroethylene to form a pressure of 310 p. s. i. inside the tube. The tetrafluoroethylene contained 1.5 p. p. m. "Terpene B" polymerization inhibitor. The tube was sealed and shaken for 22 minutes at 25°–125° C. and then for 80 minutes at 125°–202° C., during which time tetrafluoroethylene was added intermittently to maintain the pressure at 310 p. s. i. When the tube was opened it was found to contain 49.0 grams of polytetrafluoroethylene in the form of a finely divided white powder floating on the surface of the water.

*Example 6.*—A 300–ml. stainless steel shaker tube was charged with 200 ml. of deoxidized water, 0.5 gram of ditertiary butyl peroxide, and sufficient tetrafluoroethylene to effect a pressure of 370 p. s. i. inside the tube. The tetrafluoroethylene contained about 200 p. p. m. of "Terpene B." The tube was sealed and shaken for 25 minutes at a temperature of 25°–145° C., followed by 30 minutes at 145°–156° C., and finally for 35 minutes at 155°–175° C. During this shaking period, tetrafluoroethylene was introduced into the tube intermittently to maintain a pressure of 300–370 p. s. i. inside the tube. When the tube was opened, it was found to contain 19.9 grams of finely divided polytetrafluoroethylene powder unwetted by the water.

*Example 7.*—Into a 300–ml. stainless steel tube there were placed 31 stainless steel balls 3/16 inch in diameter and 0.1 gram of ditertiary butyl peroxide. The tube was then charged with sufficient tetrafluoroethylene monomer to bring the internal pressure up to 100 p. s. i. The monomer contained about 200 p. p. m. of "Terpene B" inhibitor. The tube was then sealed and shaken for 30 minutes during which time the temperature of the tube was raised to 140° C. The shaking was continued for 124 minutes at 140°–180° C. When the tube was opened it was found to contain 0.8 gram of polymer in a fine powdery form. It is to be noted that no water or other liquid medium was utilized in this experiment, and that polymer was produced notwithstanding the absence of water.

*Example 8.*—Into a 300–ml. stainless steel shaker tube there was charged 200 ml. of deoxidized water, 0.50 gram of ditertiary butyl peroxide and sufficient monomeric tetrafluoroethylene to effect a pressure of 340 p. s. i. inside the tube. The monomer contained about 2000 p. p. m. of "Terpene B" polymerization inhibitor. After the tube was sealed, it was shaken for 30 minutes while the temperature rose to 145° C. The tube was then shaken for 90 minutes at 145° C.–155° C., and 34 minutes at 154° C.–173° C. When the tube was opened, it was found to contain 2.5 grams of powdery, white polytetrafluoroethylene floating on the water.

*Example 9.*—A 300-ml. stainless steel shaker tube was charged with 200 ml. of tertiary butanol, 0.3 gram of ditertiary butyl peroxide and sufficient tetrafluoroethylene to form a pressure of 390 p. s. i. inside the tube. The tetrafluoroethylene contained about 200 p. p. m. of "Terpene B" inhibitor. After the tube was sealed it was shaken for 15 minutes during which time the temperature was raised to 110° C. The shaking was continued for 79 minutes at 135°–150° C. The tube was opened and found to contain 39.4 grams of polymer.

*Example 10.*—A 300-ml. stainless steel shaker tube was charged with 200 ml. of deoxidized water, 0.3 gram of ditertiary butyl peroxide, and 0.0005 gram of N-methyl pyrrole in 1 ml. benzene. N-methyl pyrrole is known to be an excellent polymerization inhibitor for tetrafluoroethylene. The tube was then charged with sufficient tetrafluoroethylene monomer to effect a pressure of about 350 p. s. i. when the tube was sealed. The monomer contained 5.6 p. p. m. of "Terpene B" inhibitor. The sealed tube was then shaken for 8 minutes during which time the temperature was raised to 150° C. The tube was then shaken for 148 minutes at 150°–174° C. The tube was opened and found to contain 5.9 grams of white powdery polymer, not wetted by the water.

*Example 11.*—An apparatus was assembled to demonstrate continuous production of polymer by the process of this invention. A tower was made from 19 feet of 1 inch stainless steel pipe, fitted with means for introducing and drawing off reactants and product. The pipe was fitted with means for heating or cooling the entire length of tubing to a relatively constant temperature, and with means for maintaining the reactants under pressure. Water and tetrafluoroethylene were fed continuously into the reaction tower at rates of 9.61 lbs./hr. and 2.08 lbs./hr., respectively. The tetrafluoroethylene contained 10–20 p. p. m. of oxygen and 1.4 p. p. m. of "Terpene B." The water feed contained 0.025% tertiary butyl peracetate and 0.2% ammonium perfluorocarboxylate. The tower was maintained at 119°–136° C. and at 350–365 p. s. i. Product, consisting of water and polytetrafluoroethylene was drawn off the tower during operation. After operating for 135 minutes, 0.11 lb. of polytetrafluoroethylene had been collected.

*Example 12.*—An apparatus for continuous operation was made by forming 50 feet of 5/16 inch I. D. stainless steel tubing into a coil, immersing the coil into a constant temperature bath fitting the coil with inlet and outlet means and wih means for maintaining pressure inside the coil. Reactants fed into the coil consisted of water, tetrafluoroethylene and the polymerization initiator, ditertiary butyl peroxide. The water feed rate was 1.3 lbs./hr. The tetrafluoroethylene contained 10 p. p. m. oxygen and 1.8 p. p. m. "Terpene B," and had a feed rate of 1.57 lbs./hr. The ditertiary butyl peroxide was introduced as a 5% solution in benzene and was fed into the system at a rate of 9.25 ml./hr. The temperature of the coil was maintained at 170°–181° C. and the pressure inside the coil was maintained at 350–360 p. s. i. The reaction was operated continuously for 150 minutes and a product of water and polytetrafluoroethylene weighing 3.5 lbs. was collected over that period. The polymer in the product amounted to 0.0015 lbs.

The foregoing examples show that this invention is applicable to continuous as well as batch processes for preparing powdery tetrafluoroethylene polymer in a form which is not wetted by water and in which the individual particles of polymer are smaller in size than granular polymeric particles made heretofore. It is difficult to define the size of particles produced by this process because of a tendency to cake on a screen during the shaking process, however most of the particles will pass a 100-mesh Tyler screen, and some will pass a 325-mesh screen. The polymeric particles of this process are very easily fluidized in air. Granular polymerization methods at the present produce particles which are retained on a 35-mesh Tyler screen.

In general ethylenically unsaturated hydrocarbons, an example of which is "Terpene B," are inhibitors for the polymerization of tetrafluoroethylene. Examples of such inhibitors are found in U. S. Patent 2,407,405 supra. The terpenic hydrocarbons are capable of inhibiting polymerization when they are present in concentrations as low as 1–5 p. p. m.; others of the ethylenically unsaturated inhibitors may not exhibit a satisfactory inhibiting power until their concentration in tetrafluoroethylene is higher. However, in general, concentrations will be less than 10% by weight of the tetrafluoroethylene, and in most commercial applications, less than 2000 p. p. m. Of the ethylenically unsaturated hydrocarbons which are inhibitors for the polymerization of tetrafluoroethylene, the preferred compounds have a cyclic structure. The terpenic hydrocarbons are the preferred unsaturated cyclic inhibitors, for example, "Terpene B" and alpha-pinene.

It is also known, as shown in U. S. Patent 2,407,419 supra, that tertiary hydrocarbon amines are inhibitors for the polymerization of tetrafluoroethylene. One of the amines which has been found to be particularly useful as an inhibitor is N-methyl pyrrole. Example 10 shows an embodiment of this invention in which N-methyl pyrrole is an inhibitor for the polymerization of tetrafluoroethylene. In general, the same quantities of tertiary hydrocarbon amines as that shown for the terpenic inhibitors may be employed to protect tetrafluoroethylene from self-polymerization, i. e., no more than about 2000 p. p. m.

By the process of the present invention, peroxide initiators have been found able to overcome the power of the inhibitors described herein, and to promote polymerization in spite of the presence of the inhibitors. The initiators can be classed as ditertiary alkyl peroxides and tertiary butyl peresters of alkanoic acids. The preferred initiators are ditertiary butyl peroxide and tertiary butyl peracetate. Other compounds which may be useful as initiators in certain embodiments of this invention include tertiary butyl tertiary pentyl peroxide, ditertiary pentyl peroxide, ditertiary hexyl peroxide, tertiary butyl perpropionate, tertiary pentyl peracetate, tertiary butyl performate, and others.

The amount of tertiary butyl peracetate or ditertiary butyl peroxide which is required may vary somewhat with the amount of inhibitor present. However, it is convenient to relate the amount of initiator to the volume of monomer present in the reaction. Using this relationship the amount of initiator required is no more than about 0.005 gram of catalyst per cubic centimeter of monomer at the reaction conditions. Satisfactory experiments have been performed where the ratio of grams of catalyst per cubic centimeter of monomer was as low as 0.00005. The preferred range however is from about 0.0001 to about 0.003 gram of catalyst per cubic centimeter of monomer measured at the pressure and temperature of the reaction.

It may be convenient in certain embodiments of this invention to introduce the initiator into the reaction medium as a solution. For example, ditertiary butyl peroxide may be introduced as a weak solution, using benzene as the solvent. Tertiary butyl peracetate is more soluble in water and therefore is conveniently introduced as an aqueous solution.

Although water has been used in many examples herein, its main advantage is to aid in transferring the heat of reaction away from the reactor. Example 7 shows a successful preparation of polymer in the absence of water, and Example 9 shows the operation of this invention with tertiary butanol utilized in place of water as the reaction medium. Polymerization is believed to take place in the vapor phase in each of the above examples, although it is not meant to limit this invention in this manner. The preferred ranges of temperatures and pressures of this process are such that the catalyst should be completely vaporized, and the solubility of the catalyst in water is so small that practically none of it should be present in the water.

The presence of water or an aqueous medium is not necessary for the process of this invention, although it is convenient to use water in many embodiments of this invention. Other systems which may be employed include inert liquid media, for example alcohols, the only noticeable difference being that the polymer produced is wetted by alcohols and not wetted by water. The ratio of the volume of water, or other liquid medium, to the volume of tetrafluoroethylene monomer may vary widely in various embodiments of this invention. Although a liquid medium is not necessary in this invention, it has been found that it is advantageous to employ water or other liquid as an aid to heat transfer. It is preferred therefore to operate this process in the presence of water, the preferred volume ratio of water, or other liquid medium to tetrafluoroethylene being from about 1:3 to 3:1.

Since oxygen will act as an inhibitor for the polymerization of tetrafluoroethylene, it is preferred to operate with deoxidized water, when water is employed. Other reactants, such as the initiators of this monomer should be relatively oxygen-free for best results, although amounts up to 10 p. p. m. or more oxygen do not interfere with the practice of this invention when tertiary butyl peracetate and ditertiary butyl peroxide are used as catalysts.

The process of this invention materially decreases the tendency of the polymer to adhere to the reactor walls. Dispersing agents may be added to the reaction to aid in this purpose or for other reasons. It may also be advantageous to incorporate small amounts of buffering agents or other additives for various purposes. For example, it has been found that ammonium perfluorocarboxylates, sodium nitrite, borax, etc. are desirable additives in specific applications of this invention.

The temperature of the reaction of this invention may vary considerably, but should not exceed the sintering temperature of polytetrafluoroethylene which is about 327° C. In general, temperatures from 50° C. to just below the sintering temperature are operable within the process herein described. The preferred range of temperatures is from about 100° C. to 250° C.

The pressure utilized in the process of this invention is superatmospheric. The pressure is only limited by the rate at which the exothermic heat of reaction may be removed by the equipment employed, since an increase in pressure increases the reaction rate. The preferred range of pressures, however, is from about 100 to about 500 p. s. i.

The product of this invention is a very finely divided, powdery polytetrafluoroethylene which is not wetted by water. Such a product is useful in preparing coatings on various substrates and in the preparation of films and tapes by evaporation of the liquid vehicle followed by sintering. This product can be used to prepare coatings and films of a more uniform nature because of the very small particle size. Furthermore, the product of this invention may be useful in the preparation of suspensions or dispersions of polytetrafluoroethylene by reasons of the extremely small size of the polymeric particles produced.

We claim:

1. A vapor phase process for the polymerization of tetrafluoroethylene comprising forming a reaction mixture consisting essentially of monomeric tetrafluoroethylene and 0.00005 to 0.005 gram per cubic centimeter of said tetrafluoroethylene, measured at reaction conditions, of a catalyst from the group consisting of ditertiary butyl peroxide and tertiary butyl peracetate, subjecting said mixture to a temperature of 100° C. to 300° C. and a pressure of at least 100 p. s. i. in the presence of not more than 0.001% by weight of uncombined oxygen for a period of time sufficient to permit said tetrafluoroethylene to polymerize, and recovering fluidizable polytetrafluoroethylene powder which has a screen size of about 325 mesh and which is not wetted by water.

2. The process of claim 1 carried out in the presence of a chemically inert liquid heat transfer medium.

3. The process of claim 1 in which said reaction mixture includes from 0.0005% to 10% by weight of tetrafluoroethylene of a polymerization inhibitor from the group consisting of ethylenically unsaturated hydrocarbons and tertiary hydrocarbon amines.

4. A vapor phase process for the polymerization of tetrafluoroethylene comprising forming a mixture consisting essentially of monomeric tetrafluoroethylene, 0.00005 to 0.005 gram per cubic centimeter of said tetrafluoroethylene at reaction conditions of a catalyst from the group consisting of ditertiary butyl peroxide and tertiary butyl peracetate, 0.0005% to 10% of terpenic hydrocarbons as a polymerization inhibitor, and water in a volume ratio of 1:3 to 3:1 water to tetrafluoroethylene, subjecting said mixture to a temperature of 100° C. to 300° C. and a pressure of 100 to 500 p. s. i. in the presence of not more than 0.001% by weight of uncombined oxygen, and recovering fluidizable particles of polytetrafluoroethylene, which have a screen size of about 325-mesh and which are unwetted by water.

References Cited in the file of this patent

UNITED STATES PATENTS

| | | |
|---|---|---|
| 2,531,134 | Kropa | Nov. 21, 1950 |
| 2,613,203 | Myers | Oct. 7, 1952 |